(12) United States Patent
Ichiyama et al.

(10) Patent No.: US 9,338,339 B2
(45) Date of Patent: May 10, 2016

(54) IMAGE PROCESSING APPARATUS AND IMAGE PICKUP APPARATUS

(75) Inventors: Kotaro Ichiyama, Utsunomiya (JP);
Hidetoshi Tsubaki, Kawasaki (JP); Shin Tanaka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1087 days.

(21) Appl. No.: 13/156,873

(22) Filed: Jun. 9, 2011

(65) Prior Publication Data

US 2011/0310267 A1 Dec. 22, 2011

(30) Foreign Application Priority Data

Jun. 16, 2010 (JP) .................................. 2010-137034

(51) Int. Cl.
*H04N 5/232* (2006.01)

(52) U.S. Cl.
CPC ..................................... *H04N 5/232* (2013.01)

(58) Field of Classification Search
CPC ... H04N 5/357; H04N 5/23264; H04N 5/232; G06T 5/003; G06T 5/001
USPC ................ 348/207.99, 208.99, 208.1, 208.2, 348/208.3, 208.4, 208.5, 208.6, 208.12, 348/208.13, 222.1, 241, 223.1, 224.1, 348/229.1, 230.1, 251, 254, 255; 382/254, 382/255, 263, 264, 266, 275
See application file for complete search history.

(56) References Cited

U.S. PATENT DOCUMENTS

| | | | | |
|---|---|---|---|---|
| 2003/0002746 A1* | 1/2003 | Kusaka | ................... | H04N 5/217 382/255 |
| 2003/0184663 A1* | 10/2003 | Nakano | ................ | H04N 1/4092 348/241 |
| 2007/0286517 A1* | 12/2007 | Paik | .................... | H04N 5/23212 382/255 |
| 2011/0115928 A1* | 5/2011 | Corcoran | ........... | H04N 5/23248 348/208.2 |
| 2011/0267508 A1* | 11/2011 | Kane | ..................... | G06T 7/0069 348/241 |

FOREIGN PATENT DOCUMENTS

| | | |
|---|---|---|
| JP | 2005-095328 A | 4/2005 |
| JP | 2006-234869 A | 9/2006 |
| JP | 2008-139026 A | 6/2008 |
| JP | 2009-008928 A | 1/2009 |

OTHER PUBLICATIONS

Takagi, et al., "Handbook of Image Analysis", University of Tokyo Press, pp. 77-78).
Johnson, et al., "On Contrast Sensitivity in an Image Difference Model", pp. 18-23.
Office Action issued in corresponding Japanese Patent Application No. 2010-137034, dated Oct. 21, 2014.
Japanese Office Action for corresponding JP 2010-137034, mail date Mar. 11, 2014.

* cited by examiner

*Primary Examiner* — Lin Ye
*Assistant Examiner* — Peter Chon
(74) *Attorney, Agent, or Firm* — Rossi, Kimms & McDowell LLP

(57) ABSTRACT

The image processing apparatus includes an area dividing part that divides an input image produced by an image pickup system into plural image areas whose evaluation values are mutually different. The evaluation value is obtained by using a response function of the image pickup system. The apparatus further includes a processing part that performs image processing to produce an output image whose definition is higher than that of the input image by using the response functions different for the respective image areas.

14 Claims, 11 Drawing Sheets

IMAGE PROCESSING APPARATUS AND IMAGE PICKUP APPARATUS

BACKGROUND OF THE INVENTION

1. Field of the Invention

The present invention relates to an image processing technique to increase definition of an image produced by an image pickup system.

2. Description of the Related Art

As a technique to increase definition of an image produced by an image pickup system, a super-resolution technique is known. In such a super-resolution technique, a reconstruction-based super-resolution technique performs modeling of a deterioration process in the image pickup system to produce an observation model, and solves an inverse problem thereof to increase the definition.

There are proposed methods for solving the inverse problem such as a frequency-domain technique that uses aliasing on a captured image and a MAP (Maximum a Posteriori) method that optimizes a posteriori probability of prior information to estimate a high-definition image. Moreover, a POCS (Projection onto Convex Sets) method is also proposed which combines various prior information to estimate a high-definition image.

The observation model is constituted by a response function of the image pickup system and samplings in an image sensor, the response function being obtained from a motion of the image pickup system, a deterioration in an optical system and effects of a CF (Color Filter) and an LPF (Low-Pass Filter). It is known that accuracy of reproducibility of the observation model with respect to the deterioration process in an actual image pickup system significantly influences accuracy of increasing the definition obtained by the super-resolution technique, and thus various observation models are proposed.

Japanese Patent Laid-Open No. 2005-095328 discloses a super-resolution process that uses an observation model utilizing, as the response function of the image pickup system, a PSF (Point Spread Function) of an optical system showing deterioration in the optical system.

However, the super-resolution process disclosed in Japanese Patent Laid-Open No. 2005-095328 uses a same response function for the entire image, and therefore cannot sufficiently increase the definition in an image area where the response function to be used is significantly different from an actual response function of the image pickup system.

On the other hand, using different response functions for respective pixels constituting an entire image in the super-resolution process makes it possible to solve such a problem. However, a memory capacity required for storing the response functions for all the respective pixels becomes large, which it is undesirable.

SUMMARY OF THE INVENTION

The present invention provides an image processing apparatus and an image pickup apparatus capable of sufficiently increasing definition of an image while reducing a required memory capacity as much as possible.

The present invention provides as one aspect thereof an image processing apparatus including an area dividing part configured to divide an input image produced by an image pickup system into plural image areas whose evaluation values are mutually different, the evaluation value being obtained by using a response function of the image pickup system, and a processing part configured to perform image processing to produce an output image whose definition is higher than that of the input image by using the response functions different for the respective image areas.

The present invention provides as another aspect thereof an image processing apparatus including a storing part configured to store a result of division of a first input image produced by an image pickup system into plural first image areas whose evaluation values are mutually different, the evaluation value being obtained by using a response function of the image pickup system, an area dividing part configured to divide a second input image produced by the image pickup system into plural second image areas by using the result of division of the first input image stored in the storing part, and a processing part configured to perform image processing to produce an output image whose definition is higher than that of the second input image by using the response functions different for the respective second image areas.

The present invention provides as further another aspect thereof an image pickup apparatus including an image pickup system, and one of the above-described image processing apparatuses.

The present invention provides as still another aspect thereof an image processing program that causes a computer to perform operations. The operations include dividing an input image produced by an image pickup system into plural image areas whose evaluation values are mutually different, the evaluation value being obtained by using a response function of the image pickup system, and performing image processing to produce an output image whose definition is higher than that of the input image by using the response functions different for the respective image areas.

The present invention provides as yet still another aspect thereof an image processing program that causes a computer to perform operations. The operations include storing a result of division of a first input image produced by an image pickup system into plural first image areas whose evaluation values are mutually different, the evaluation value being obtained by using a response function of the image pickup system, dividing a second input image produced by the image pickup system into plural second image areas by using the result of division of the first input image stored in the storing part, and performing image processing to produce an output image whose definition is higher than that of the second input image by using the response functions different for the respective second image areas.

The present invention provides as further still another aspect thereof a computer readable storage medium storing one of the above-described computer programs.

Further features of the present invention will become apparent from the following description of exemplary embodiments (with reference to the attached drawings).

DESCRIPTION OF THE PREFERRED EMBODIMENTS

Exemplary embodiments of the present invention will hereinafter be described with reference to the accompanying drawings.

Embodiment 1

Figure 1:
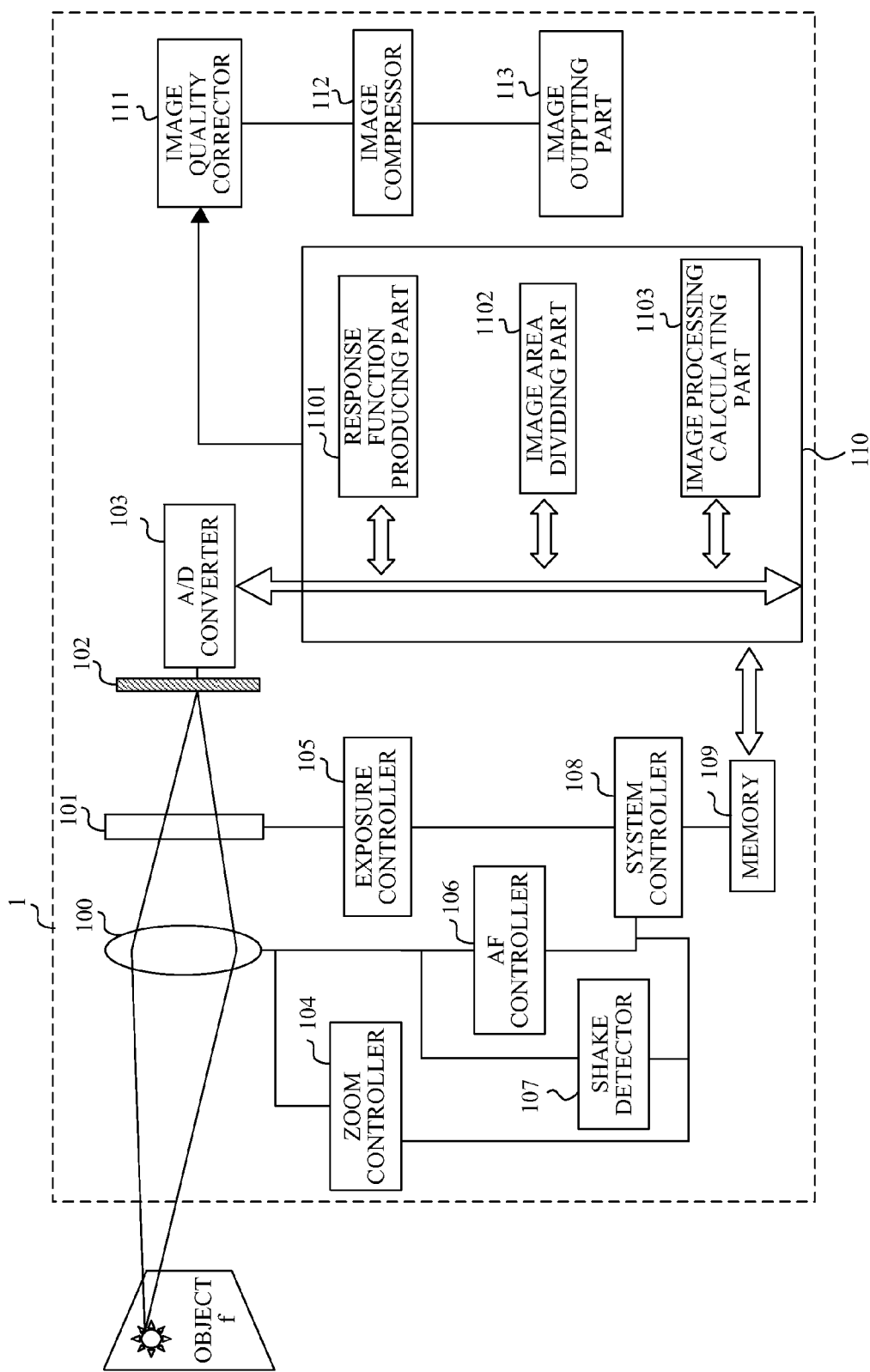
FIG. 1 is a block diagram showing the configuration of an image pickup apparatus that is Embodiment 1 of the present invention.

FIG. 1 shows the configuration of an image pickup apparatus 1 that is a first embodiment (Embodiment 1) of the present invention. The image pickup apparatus 1 includes an imaging optical system 100, an exposure controlling unit 101, an image sensor (image pickup element) 102, an A/D converter 103, a zoom controller 104, an exposure controller 105, an AF controller 106 and a shake detector 107. Moreover, the image pickup apparatus 1 includes a system controller 108, a memory 109, an image processor (image processing apparatus) 110, an image quality corrector 111, an image compressor 112 and an image outputting part 113. Reference character f denotes an object to be captured by the image pickup apparatus 1.

In FIG. 1, light from the object f passes through the imaging optical system 100 and the exposure controlling unit 101 to form an object image (optical image) on the image sensor 102. The exposure controlling unit 101 includes an aperture stop and a shutter.

The image sensor 102 is constituted by a CCD sensor or a CMOS sensor, and photoelectrically converts the object image into an analog electrical signal. The A/D converter 103 converts the analog electrical signal output from the image sensor 102 into digital data. The imaging optical system 100, the exposure controlling unit 101, the image sensor 102 and the A/D converter 103 constitute an image pickup system.

The zoom controller 104 controls zooming of the imaging optical system 100. The exposure controller 105 controls operations of the exposure controlling unit 101. The AF controller 106 controls focusing of the imaging optical system 100.

The shake detector 107 detects shaking of the image pickup apparatus 1. The system controller 108 is constituted by a microcomputer or the like, and governs control of the entire operations of the image pickup apparatus 1.

The memory (storing part) 109 stores data and computer programs that are used in the system controller 108 for controlling entire operations of the image pickup apparatus 1. The computer programs include an image processing program described later.

The image processor 110 performs on a captured image (input image), which is digital data output from the A/D converter 103, a high-definition imaging process to produce a high-definition image having a higher (increased) definition than that of the captured image.

The image quality corrector 111 performs image correction processes for improving image quality of the high-definition image produced by the image processor 110, the image correction processes including tone curve (gamma) correction, chroma emphasis, color correction, edge enhancement and the like.

The image compressor 112 performs image compression on the high-definition image output from the image quality corrector 111 by using a compression method such as JPEG to reduce a size of the high-definition image to be recorded.

The image outputting part 113 displays the compressed image output from the image compressor 112 and records it in a recording medium such as a semiconductor memory and an optical disk.

Next, description will be made of the configuration of the image processor 110. Reference numeral 1101 denotes a response function producing part that produces a response function of the image pickup system (hereinafter referred to as an "image pickup system response function"). Reference numeral 1102 denotes an image area dividing part that divides the captured image taken in from the A/D converter 103 into plural image areas by using the image pickup system response function obtained from the response function producing part 1101. The image area dividing part 1102 produces information on a division result of the captured image, that is, information on the divided image areas (hereinafter also referred to as "image area division information").

Reference numeral 1103 denotes an image processing calculating part that performs the high-definition imaging process on the captured image (input image) by using the image area division information obtained from the image area dividing part 1102.

Figure 2:
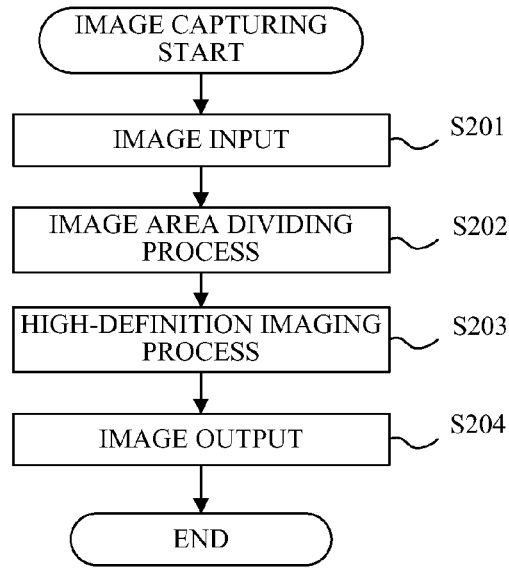
FIG. 2 is a flowchart showing operations of the image pickup apparatus of Embodiment 1.

Next, description will be made of operations of the image pickup apparatus 1 with reference to a flowchart shown in FIG. 2. The flowchart of FIG. 2 shows a series of processes (operations) including image capturing of the object f, production of the high-definition image from the captured image, and output of the high-definition image through the image outputting part 113. The system controller 108 executes the series of processes according to a computer program (image processing program) stored in the memory 109. This also applies to other embodiments described later.

At step S201, in response to a user's operation of an image capturing start switch (not shown), the system controller 108 causes the exposure controller 105 to decide an exposure condition such as an aperture value and an exposure time period, and causes the AF controller 106 to perform focusing. An image capturing condition such as the exposure condition, a focus position and a zoom position is stored in the memory 109.

Moreover, at this step, the system controller 108 drives, in response to detection of shaking of the image pickup apparatus 1 due to hand jiggling or the like through the shake detector 107, a shake correction optical system (image stabilizing optical system) (not shown) provided in the imaging optical system 100 to correct image blur.

Then, the system controller 108 causes the image sensor 102 to photoelectrically convert the object image. The image sensor 102 outputs an analog electrical signal corresponding to luminance of the object image. The A/D converter 103 converts the analog electrical signal into digital data forming a captured image. The captured image is sent to the image processor 110.

Next at step S202, the system controller 108 causes the image area dividing part 1102 to perform an image area dividing process to divide the captured image into plural image areas that are shift-invariant areas. The shift invariant area herein means an area where a same image pickup system response function is used for the high-definition imaging process. In other words, when plural shift invariant areas exist, the high-definition imaging process is performed on the shift-invariant areas by using mutually different image pickup system response functions for the respective shift-invariant areas.

Figure 3:
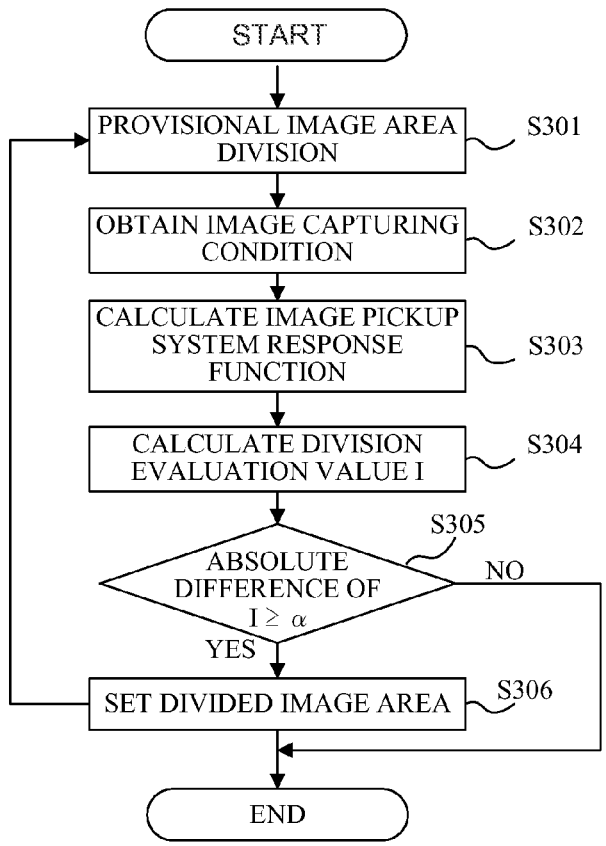
FIG. 3 is a flowchart showing operations of an image area dividing part in the image pickup apparatus of Embodiment 1.

A detailed description will be made of the image area dividing process performed at this step S202 with reference to a flowchart shown in FIG. 3.

First at step S301, the image area dividing part 1102 performs provisional image area division. The provisional image area division is performed in order to calculate evaluation values of plural divided image areas (provisional divided image areas) obtained by provisionally performing image area division. The evaluation value will be more described later. Determination is made based on the evaluation values whether or not the provisional divided image areas are afterward to be used as final divided image areas.

Figure 4:
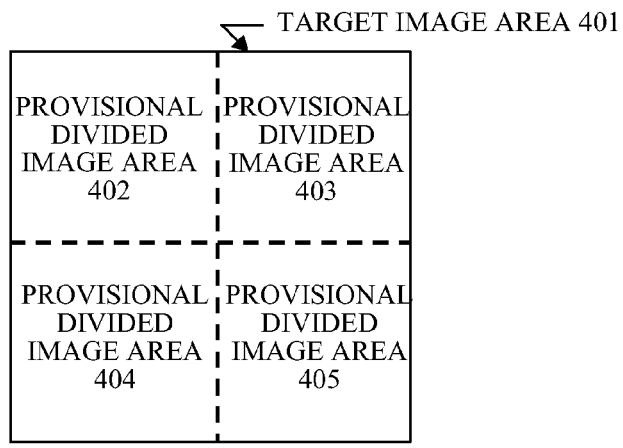
FIG. 4 shows division of a target image area into four provisional divided image areas.

FIG. 4 shows an example of a result of the provisional image area division. FIG. 4 shows four rectangular provisional divided image areas 402, 403, 404 and 405 obtained by the provisional image area division of a target image area (to-be-divided area) 401. As methods for the provisional image area division, a method of dividing an entire image area (target image area) into integral numbers of rectangular divided image areas such as four image areas or nine image areas, a method of dividing the entire image area into plural image areas each having a specified size, and a method of dividing the entire image area into plural image areas having shapes other than rectangle such as concentric circles may be used.

Next at step S302, the image area dividing part 1102 retrieves, from the memory 109, the image capturing condition for the previous production of the captured image on which the high-definition imaging process will be performed. The image capturing condition is a parameter (or parameters) that changes the image pickup system response function in the image area, such as the above-described zoom position, focus position, aperture value and exposure time period.

At step S303, the image area dividing part 1102 obtains the image pickup system response function from the response function producing part 1101. The response function producing part 1101 produces the image pickup system response functions for the respective provisional divided image areas by using the image capturing condition obtained at step S302. Specifically, the response function producing part 1101 produces the image pickup system response function at a representative position of each provisional divided image area. The representative position corresponds to, for example, a center pixel of each provisional divided image area. The image pickup system response function may be produced by any method such as a method of calculating the image pickup system response function by ray tracing on the basis of image pickup system design information under the image capturing condition, and a method of retrieving the image pickup system response function prestored in a memory.

Next at step S304, the image area dividing part 1102 calculates the above-described evaluation value (hereinafter referred to as a "division evaluation value") I in each provisional divided image area by using the image pickup system response function of each provisional divided image area obtained from the response function producing part 1101 at step S303.

In this embodiment, the division evaluation value I is calculated by the following expression (1) using an image pickup system MTF (Modulation Transfer Function) that is one image pickup system response function:

$$I = \int_{\xi_1}^{\xi_2} MTF(\xi) d\xi \quad (1)$$

where $\xi$ represents a spatial frequency, MTF represents the image pickup system MTF, $\xi 1$ and $\xi 2$ respectively represent constants for setting an upper limit and a lower limit of the spatial frequency. As shown by the expression (1), the division evaluation value I is calculated by integrating the image pickup system MTF with respect to the spatial frequency.

Comparing the division evaluation values I calculated for the respective provisional divided image areas by using the expression (1) corresponds to evaluating change of the image pickup system response function (that is, a difference of the image pickup system response functions). Therefore, as described below, this makes it possible to obtain an image area division result according to the change of the image pickup system response function.

Next at step S305, the image area dividing part 1102 compares the division evaluation values I of the respective provisional divided image areas which has been calculated at step S304. Specifically, the image area dividing part 1102 calculates differences of the division evaluation values I of the respective provisional divided image areas, and determines whether or not an absolute value of each difference is equal to or more than a preset threshold (predetermined value) a.

In this description, the division evaluation values of the provisional divided image areas 402, 403, 404 and 405 are respectively represented by 1402, 1403, 1404 and 1405. Then, for example as shown by the following expression (2), if there is at least one combination of the division evaluation values whose difference (absolute value) is equal to or more than the threshold α, the image area dividing part 1102 proceeds to step S306.

$$|I402-I403|>\alpha, |I402-I404|<\alpha, |I403-I405|>\alpha, |I404-I405|<\alpha \quad (2)$$

Figure 5:
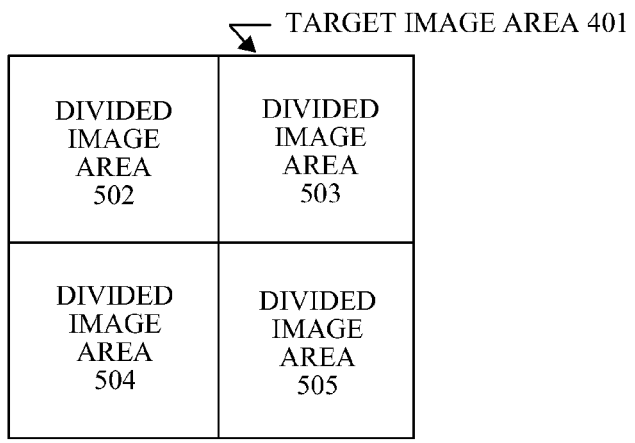
FIG. 5 shows division of the target image area into four final divided image areas.

At step S306, the image area dividing part 1102 sets the provisional divided image areas to final divided image areas. As a result, as shown in FIG. 5, divided image areas (final divided image areas) 502, 503, 504 and 505 corresponding to the provisional divided image areas 402, 403, 404 and 405 are produced from the target image area 401. The image area dividing part 1102 repeats the processes from steps S301 to S306 for the respective divided image areas (in other words, for each divided image area).

Figure 6:
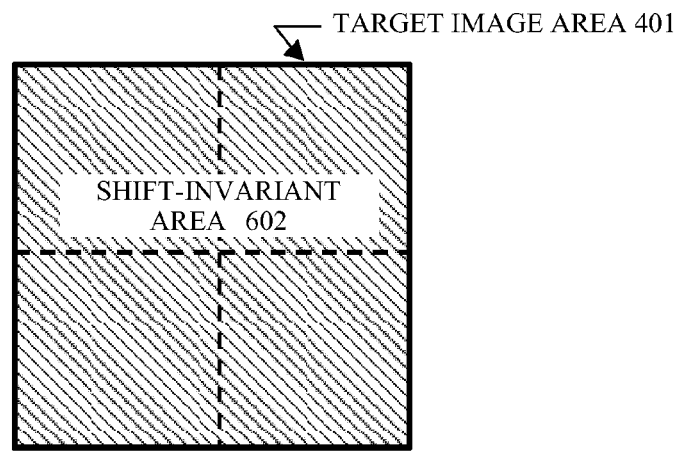
FIG. 6 shows a case where the target image area is determined to be a shift-invariant area.

On the other hand, if there is no combination of the division evaluation values whose difference (absolute value) is equal to or more than the threshold α at step S305 as shown in the following expression (3), the image area dividing part 1102 does not set the provisional divided image areas to the final divided image areas. In this case, as shown in FIG. 6, the image area dividing part 1102 sets the target image area 401 including the provisional divided image areas 402, 403, 404 and 405 to the shift-invariant area 602.

$$|I402-I403|<\alpha, |I402-I404|<\alpha, |I403-I405|<\alpha, |I404-I405|<\alpha \quad (3)$$

The image area dividing part 1102 ends the image area dividing process for the divided image areas set to the shift-invariant area. In addition, the image area dividing part 1102 ends the image area dividing process when all the divided image areas are set to the shift-invariant area.

Figure 7:
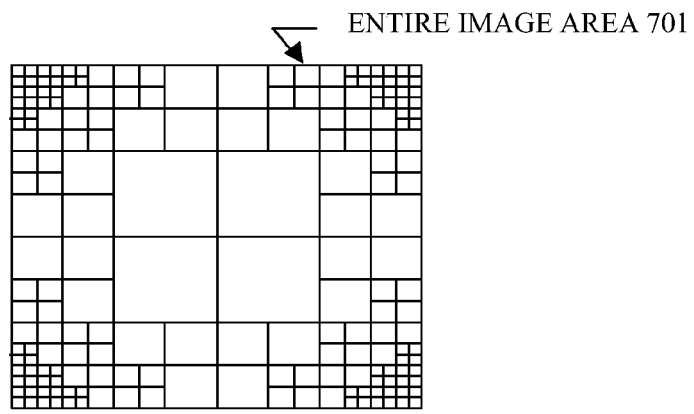
FIG. 7 shows an example of division of an entire image area into shift-invariant areas.

When the change of the image pickup system response function is small at a central part of the entire image area and increases toward a peripheral part thereof, the final image area division result of the entire image area 701 is obtained as shown in FIG. 7. FIG. 7 shows the image area division result in which the sizes of the divided image areas are different from each other according to the change of the image pickup system response function.

Such an image area dividing method enables division of the entire image area into the shift-invariant areas corresponding to a characteristic of an arbitrary image pickup system. And, using one image pickup system response function for each shift-invariant area (that is, using different image pickup system response functions for the respective shift-invariant areas) can make a memory capacity for holding (storing) the image pickup system response functions smaller than a case of using different image pickup system response functions for all respective pixels.

Moreover, when the change of the image pickup system response function significantly varies at positions in the image as shown in FIG. 7, the above-described image area dividing method enables more efficient increase of the definition in the high-definition imaging process described later as compared with a case of equally dividing the image area.

Figure 8:
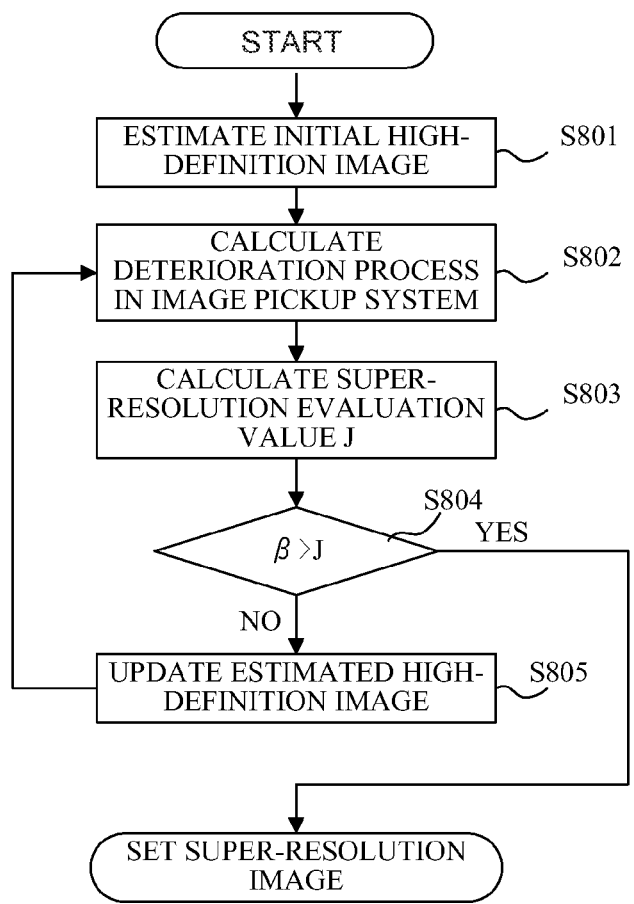
FIG. 8 is a flowchart showing operations of an image processing calculating part in the image pickup apparatus of Embodiment 1.

Next at step S203 in FIG. 2, the system controller 108 causes the image processing calculating part 1103 to perform the high-definition imaging process (image processing) on the captured image. A detailed description of the process at this step will be made with reference to a flowchart shown in FIG. 8. At this step, a reconstruction-based super-resolution process is performed as the high-definition imaging process.

An image on which the super-resolution process is performed is hereinafter referred to as a "reference image". First, the image processing calculating part 1103 takes in the reference image and plural images obtained by image capturing for a same scene as that of the reference image from viewpoints minutely different from that from which image capturing for obtaining the reference image has been performed. In the following description, each of the plural images whose image capturing viewpoints are different from that for the reference image is referred to as a "captured image (input image)", and the plural captured images are collectively referred to as a "captured image group". Moreover, the number of the plural captured images is represented by N. The number of the captured images included in the captured image group is arbitrarily set according to performance of the image pickup system, an enlarging magnification of the super-resolution process and use purpose of the images after the super-resolution process (super-resolution images).

At step S801, the image processing calculating part 1103 performs an enlarging process on the reference image according to the set enlarging magnification to produce a first estimated high-definition image (hereinafter referred to as an "initial estimated high-definition image"). As the enlarging process, any process may be used such as simple linear interpolation and spline interpolation.

Next at step S802, the image processing calculating part 1103 calculates a deterioration process in the image pickup system by using the image area division information produced at step S202, the image pickup system response functions for the respective divided image areas and the initial estimated high-definition image, and produces a low-resolution image based on the deterioration process. The calculation of the deterioration process in the image pickup system uses an observation model obtained by modeling of the deterioration process. The observation model is given as follows by using a PSF (Point Spread Function) that is one image pickup system response function:

$$Y'_k(x,y)=PSF_k(x,y)*X(x,y)+n$$

$$1 \leq k \leq N \quad (4)$$

where X represents a high-definition image, $Y'_k$ represents a k-th low resolution image after the deterioration process, * represents convolution operation and n represents additional noise. Moreover, $PSF_k$ represents an image pickup system response function for a k-th captured image in the captured image group. The calculation of the deterioration process uses the first term in the right side of the expression (4). The observation model is not limited to that expressed by the expression (4), and may be arbitrarily decided according to the characteristic of the image pickup system and an algorithm of the super-resolution process. Moreover, the calculation of the deterioration process may use an OTF (Optical Transfer Function) as the image pickup system response function. In this case, using one OTF for each of the shift-invariant areas obtained by dividing the image area enables not only memory capacity reduction, but also calculation amount reduction as compared with the case of using different image pickup system response functions for all respective pixels.

In the calculation of the deterioration process, with reference to the image area division information, the expression (4) is calculated by using the image pickup system response function corresponding to the divided image area including a calculation target pixel.

Next at step S803, the image processing calculating part 1103 calculates an evaluation value (hereinafter referred to as a "super-resolution evaluation value") J by the following expression (5) using the low-resolution images used in the calculation of the deterioration process:

$$J = \sum_k \|Y'_k - Y_k\|_2^2 + \alpha \|c * X\|_2^2 \quad (5)$$

where $Y_k$ represents a k-th captured image, $Y'_k$ represents the k-th low-resolution image and α represents a constraint parameter. Moreover, c represents a matrix showing the prior information on the estimated high-definition image, and $\| \|_2$ shows an L2 norm.

The first term of the super-resolution evaluation value J is a term for evaluating the estimated high-definition image by comparing the captured image with the low-resolution image produced by deteriorating the estimated high-definition image. The second term of the super-resolution evaluation value J is a term for evaluating plausibility of the estimated high-definition image by using known information and property of the estimated high-definition image. The constraint parameter α is arbitrarily set according to the image and the image pickup system. As the matrix c, for example, a high-pass filter is used.

The evaluation of the super-resolution evaluation value J may be evaluated by other methods than the use of the expression (5), such as a bilateral filter described in "Multiframe Demosaicing and Super-Resolution of Color Images" written by Sina Farsiu, et al. (IEEE TRANSACTION ON IMAGE PROCESSING, VOL. 15, No. 1, JANUARY 2006), or a correlation of colors.

Next at step S804, the image processing calculating part 1103 determines whether or not the super-resolution evaluation value J calculated at step S803 is smaller than a threshold (predetermined value) β. The threshold β is arbitrarily set according to kind of the image, performance of the image pickup system and purpose of the high-definition imaging process. If J is equal to or larger than β, the image processing calculating part 1103 proceeds to step S805. If J is smaller than β, the image processing calculating part 1103 ends the high-definition imaging process, and decides the estimated high-definition image as the super-resolution image. Then, the image processing calculating part 1103 proceeds to step S204 in FIG. 2.

At step S805, the image processing calculating part 1103 updates the estimated high-definition image in a direction to optimize the super-resolution evaluation value J calculated at step S803. Any method can be used as the updating method. For example, a steepest descent method may be used to update the estimated high-definition image X as follows:

$$X' = X - \gamma \frac{\partial J}{\partial X} \quad (6)$$

where X' represents the updated estimated high-definition image, and γ represents a constant for setting an updating step size. Subsequently, the image processing calculating part 1103 sets the updated estimated high-definition image X' to a new estimated high-definition image, and repeats the processes from step S802 to obtain the super-resolution image.

At step S204 in FIG. 2, the system controller 108 performs a process to output the high-definition image produced at step S203. First, the system controller 108 causes the image quality corrector 111 to perform the above-described image correction processes on the high-definition image. Next, the system controller 108 causes the image compressor 112 to perform the image compression on the high-definition image after the image correction processes. Then, the system controller 108 causes the image outputting part 113 to output the compressed high-definition image.

The above-described embodiment can calculate the shift-invariant areas corresponding to an arbitrary image pickup system, and can perform the high-definition imaging process by using the image pickup system response functions stored for the respective shift invariant areas. Therefore, this embodiment enables approximation of the image pickup system response function for each shift-invariant area, which makes it possible to more accurately estimate the high-definition image as compared with the case of performing the high-definition imaging process by using the same image pickup system response function over the entire image area. Moreover, this embodiment enables reduction of a memory capacity for storing the image pickup system response functions as compared with a case of storing the image pickup system response functions for all respective pixels.

Embodiment 2

Next, description will be made of an image pickup apparatus that is a second embodiment (Embodiment 2) of the present invention. The image pickup apparatus of this embodiment performs weighting on the change of the image pickup system response function (that is, on the image pickup system response functions of the provisional divided image areas) based on a spatial frequency characteristic of human vision to evaluate the weighted change of the image pickup system response function, and performs the image area division based on the division evaluation value resulted from the evaluation. The weighting is effective to reduce the number of the divided image areas, that is, to reduce a memory capacity for storing the image pickup system response functions for the respective divided image areas. This also applies to cases of performing other weighting processes described later. This embodiment is different from Embodiment 1 only in the division evaluation value calculation process, which is performed in Embodiment 1 at step S304 shown in FIG. 3, and the configuration of the image pickup apparatus and other processes in this embodiment are same as those in Embodiment 1.

This embodiment (image area dividing part 1102) calculates the division evaluation value based on a combination of the image pickup system MTF and a CMTA (Cascaded Modulation Transfer acutance) calculated by using the spatial frequency characteristic of human vision. The CMTA being used herein will be explained based on "Handbook of Image Analysis (Revised edition)" written by M. Takagi et al. (University of Tokyo Press, pp. 77-78).

The shift-invariant area can be determined by using the change of the image pickup system response function. However, it is known that human vision has a distinct spatial frequency characteristic that there exits a spatial frequency significantly reacting to the change of the image pickup system response function and a spatial frequency slightly reacting thereto. Therefore, the weighting of the change of the image pickup system response function based on the spatial frequency characteristic of human vision enables treating the shift-invariant areas as areas that are not recognized by human to achieve more efficient image area division.

A response function of human vision for a spatial frequency is known as a CSF (Contrast Sensitivity Function). The CSF is a result of modeling in consideration of a low-pass filter characteristic of an imaging system in an eyeball and a band-pass filter characteristic of a signal processing system from a retina to a brain.

The CSF is expressed by, for example, the following expression (7):

$$CSF(\xi) = 5.05 \exp(-0.138\xi)\{1 - \exp(-0.1\xi)\} \quad (7)$$

where ξ represents the spatial frequency, which is expressed with a unit of [cycle/deg] that shows how many contrast stripes are visible for human eyes within a visual angle of one degree. The CSF varies depending on individual differences, races, colors and the like, and generally has a peak on a low frequency side except at a frequency of 0. There are other CSFs than the above-described model such as Movshon, Barten and Daly described in "On contrast sensitivity in an image difference model" written by G. M. Johnson et al. (IS&T PICS 2002, Portland, 18-23 (2002)), and selection of which one of the models may be arbitrarily made depending on required accuracy and allowed calculation time.

When a result of normalization of a value obtained by integration of a product of the image pickup system MTF and the CSF in a certain spatial frequency range is referred to as an "SQF (Subjective Quality Factor)", and the image-pickup system MTF is represented by MTF, the SQF is expressed by the following expression (8):

$$SQF = \frac{\int_{\xi_1}^{\xi_2} MTF(\xi)CSF(\xi)d\xi}{\int_{\xi_1}^{\xi_2} CSF(\xi)d\xi} \quad (8)$$

where $\xi$ represents a spatial frequency, and $\xi_1$ and $\xi_2$ respectively represent constants for setting an upper limit and a lower limit of the spatial frequency. The SQF is a result of weighting of the image pickup system response function based on the CSF.

The CMTA is a result of normalization of the SQF, which is set so as to response linearly to human sense by using Weber-Fechner's law, to 100. The Weber-Fechner's law is a law that human sense is proportional to logarithm of stimulation. Therefore, the CMTA is formulated as the following expression (9):

$$CMTA = 100 + 66 \log_{10}(SQF) \quad (9)$$

Employing the CMTA as the division evaluation value enables provision of a result of the image area division that reflects the spatial frequency characteristic of human vision.

The above-described embodiment enables image area division into image areas that human cannot recognize the change of the image pickup system response function by using the division evaluation values obtained by the weighting of the image pickup system response function based on the CSF. This makes it possible to estimate a high-definition image further matched to human vision characteristics, and to reduce a memory capacity for storing the image pickup system response functions as compared with a case of storing the image pickup system response functions for all respective pixels.

Embodiment 3

Next, description will be made of an image pickup apparatus that is a third embodiment (Embodiment 3) of the present invention. The image pickup apparatus of this embodiment performs weighting on the change of the image pickup system response function (that is, on the image pickup system response functions of the provisional divided image areas) based on a spatial frequency characteristic of the high-definition imaging process (image processing) performed at step 203 shown in FIG. 2 to evaluate the weighted change of the image pickup system response function, and performs the image area division based on the division evaluation value resulted from the evaluation. This embodiment is different from Embodiment 1 only in the division evaluation value calculation process, which is performed in Embodiment 1 at step S304 shown in FIG. 3, and the configuration of the image pickup apparatus and other processes in this embodiment are same as those in Embodiment 1.

The spatial frequency characteristic of the high-definition imaging process means a characteristic of the high-definition imaging process that performs different processes according to the spatial frequency to provide different effects so as to, for example, divide a captured image into components of different spatial frequencies and perform the high-definition imaging process only on a high-frequency component. In Such a high-definition imaging process, the division evaluation value in which contribution of the image pickup system MTF to a spatial frequency component receiving a significant effect is emphasized is set, which enables image area division appropriate for the high-definition imaging process. Moreover, also when an arbitrary process such as modulation of a specific spatial frequency component is performed, image area division can be made according to purpose of that process.

Figure 9:
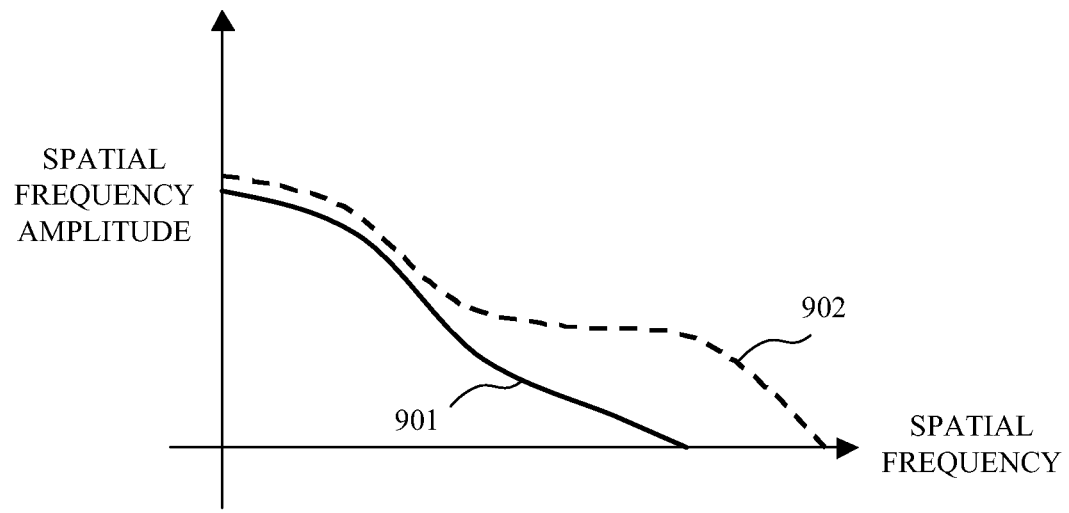
FIG. 9 shows spatial frequency characteristics of a captured image before and after a high-definition imaging process.

Description of the spatial frequency characteristic of the high-definition imaging process will be described with reference to FIG. 9. A horizontal axis in FIG. 9 shows spatial frequency, and a vertical axis shows spatial frequency amplitude. A solid line graph 901 shows a spatial frequency characteristic of an input image before the high-definition imaging process. A dotted line graph 902 shows a spatial frequency characteristic of an image after the high-definition imaging process.

The high-definition imaging process shown in FIG. 9 is a process having a spatial frequency characteristic that provides a more significant effect to a high-frequency component than to a low frequency component. Calculation of the division evaluation value uses a weighted spectrum MTFp that reflects this spatial frequency characteristic of the high-definition imaging process.

Figure 10:
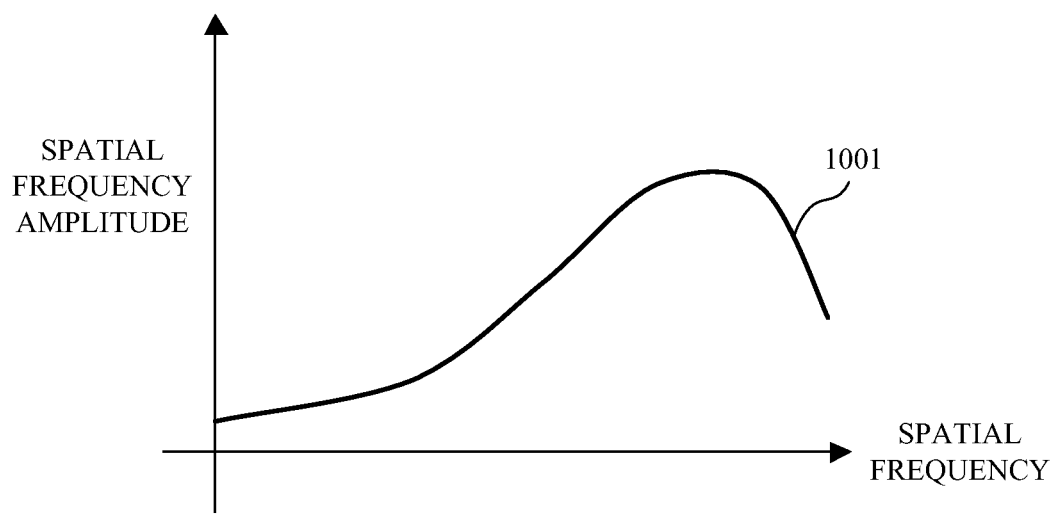
FIG. 10 shows a spatial frequency characteristic of the high-definition imaging process.

FIG. 10 shows an example of the MTFp in the high-definition imaging process providing the effect shown in FIG. 9. A horizontal axis in FIG. 10 shows spatial frequency, and a vertical axis shows weighting intensity in each spatial frequency. A graph 1001 shows the MTFp.

The MTFp is calculated by dividing the spatial frequency characteristic of the image after the high-definition imaging process by the spatial frequency characteristic of the input image before the high-definition imaging process. The MTFp may be calculated by other methods according to their purposes than the above method, such as using an approximative polynomial model or a model arbitrarily emphasizing a specific frequency component.

This embodiment (image area dividing part 1102) calculates the division evaluation value I using the following expression (10):

$$I = \frac{\int_{\xi_1}^{\xi_2} MTF(\xi)MTF_p(\xi)d\xi}{\int_{\xi_1}^{\xi_2} MTF_p(\xi)d\xi} \quad (10)$$

where $\xi$ represents a spatial frequency, and $\xi_1$ and $\xi_2$ respectively represent constants for setting an upper limit and a lower limit of the spatial frequency. The division evaluation value I is a result of normalization of a product of the image pickup system MTF and the MTFp based on the spatial frequency characteristic of the high-definition imaging process. Comparison of the division evaluation value I between the provisional divided image areas corresponds to evaluation of the change of the image pickup system response function with weighting appropriate for the method of the high-definition imaging process. Therefore, the calculation of the division evaluation value I by using the expression (10) makes it possible to obtain an image area division result appropriate for the high-definition imaging process.

Thus, this embodiment enables image area division into image areas in which the change of the image pickup system response function in a specific spatial frequency according to purpose of the high-definition imaging process is sufficiently small. This makes it possible to obtain a sufficient effect of the high-definition imaging process, and to reduce a memory capacity for storing the image pickup system response functions as compared with a case of storing the image pickup system response functions for all respective pixels.

Embodiment 4

Next, description will be made of an image pickup apparatus that is a fourth embodiment (Embodiment 4) of the present invention. The image pickup apparatus of this embodiment performs weighting of the change of the image pickup system response function based on a spatial frequency characteristic of a captured image (input image) to evaluate the weighted change of the image pickup system response function, and performs the image area division based on the division evaluation value resulted from the evaluation.

Figure 11:
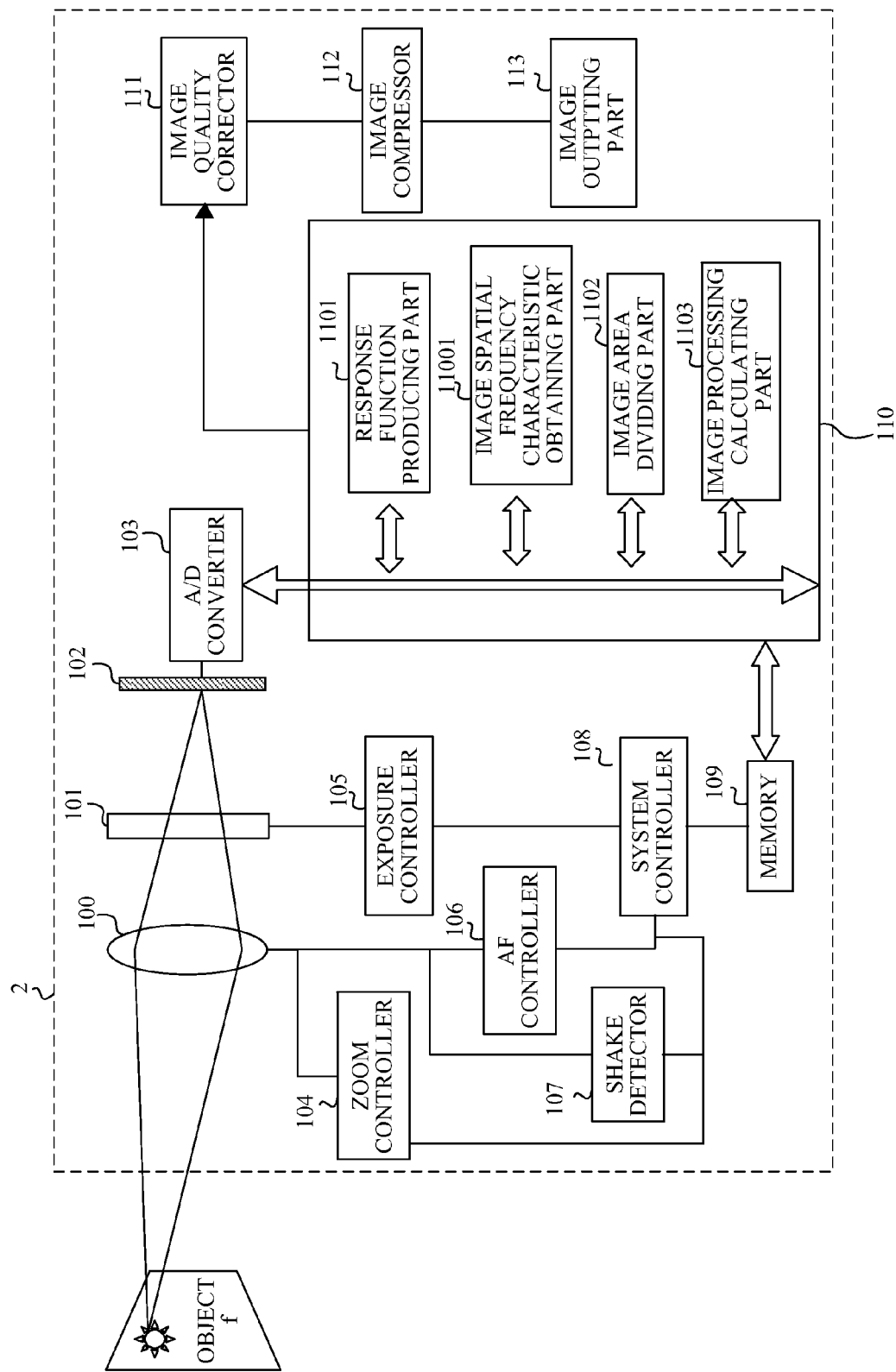
FIG. 11 is a block diagram showing the configuration of an image pickup apparatus that is Embodiment 4 of the present invention.

In the image pickup apparatus 2 shown in FIG. 11, components identical to those in the image pickup apparatus 1 shown in FIG. 1 are denoted by the same reference numerals as those in Embodiment 1 and their description is omitted. The image pickup apparatus 2 is different from the image pickup apparatus 1 in that it includes an image spatial frequency characteristic obtaining part 11001. The image spatial frequency characteristic obtaining part 11001 obtains the spatial frequency characteristic of the captured image produced by the image pickup system.

Figure 12:
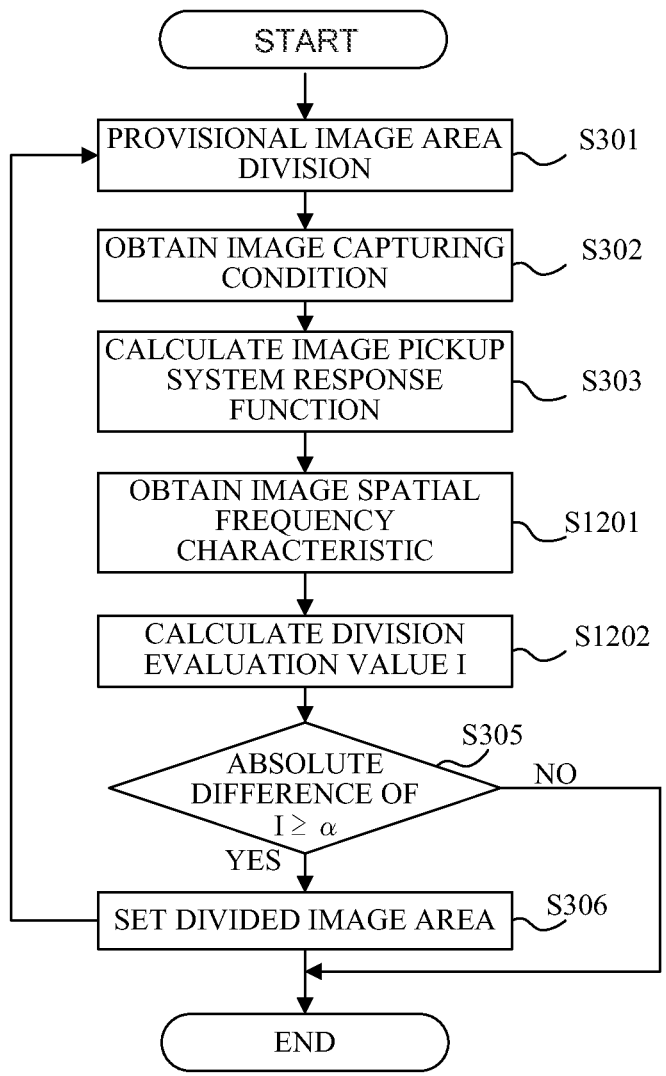
FIG. 12 is a flowchart showing operations of an image area dividing part in the image pickup apparatus of Embodiment 4.

Next, description of operations of the image pickup apparatus 2 will be made. Only operations different from those of the image pickup apparatus 1 of Embodiment 1 will be herein made. Specifically, in this embodiment, at step S202 shown in FIG. 2, an image area dividing process shown by a flowchart of FIG. 12 is performed, instead of the image area dividing process shown by the flowchart of FIG. 3. Steps in FIG. 12 identical to those in FIG. 3 are denoted by the same step numbers as those in FIG. 3 and their description is omitted.

After performing the processes at steps S301 to S303, the image area dividing part 1102 at step S1201 obtains the spatial frequency characteristic of the captured image on which the high-definition imaging process will be performed, from the image spatial frequency characteristic obtaining part 11001.

Next, at step S1202, the image area dividing part 1102 weights the change of the image pickup system response function based on the spatial frequency characteristic of the captured image obtained at step S1201, and then calculates the division evaluation value.

When most part of the captured image, such as an image of sky, is occupied by a low-frequency component having a low spatial frequency, main part of an image after the high-definition imaging process is also occupied by a low-frequency component as compared with a high-frequency component. In such an image having a prominent feature of the spatial frequency characteristic, calculation of the division evaluation value weighted base on that spatial frequency characteristic enables image area division appropriate for the captured image.

The division evaluation value I is calculated by the following expression (11) including a weighted spectrum $MTF_t$ that reflects the spatial frequency characteristic of the captured image. The $MTF_t$ is a result of polynomial approximation to the spatial frequency characteristic of the captured image.

$$I = \frac{\int_{\xi_1}^{\xi_2} MTF(\xi) MTF_t(\xi) d\xi}{\int_{\xi_1}^{\xi_2} MTF_t(\xi) d\xi} \quad (11)$$

where $\xi$ represents a spatial frequency, and $\xi 1$ and $\xi 2$ respectively represent constants for setting an upper limit and a lower limit of the spatial frequency. The division evaluation value I is a result of normalization of a product of the image pickup system MTF and the weighted spectrum $MTF_t$ based on the spatial frequency characteristic of the captured image. Comparison of the division evaluation value I between the provisional divided image areas corresponds to evaluation of the change of the image pickup system response function weighted according to the spatial frequency characteristic of the captured image. Therefore, the calculation of the division evaluation value I by using the expression (11) makes it possible to obtain an image area division result appropriate for the captured image.

After completion of the process at step S1202, the image area dividing part 1102 proceeds to steps S305 and S306.

Thus, this embodiment enables image area division into image areas in which the change of the image pickup system response function in a specific spatial frequency according to the spatial frequency characteristic of the captured image is sufficiently small. This makes it possible to obtain a sufficient effect of the high-definition imaging process for the main spatial frequency component in the captured image, and to reduce a memory capacity for storing the image pickup system response functions as compared with a case of storing the image pickup system response functions for all respective pixels.

Embodiment 5

Next, description will be made of an image pickup apparatus that is a fifth embodiment (Embodiment 5) of the present invention. The image pickup apparatus of this embodiment performs an image area dividing process not over the entire image area, but only in a partial image area including a specified position (hereinafter referred to as a "representative position"). And, the image pickup apparatus of this embodiment equally divides the entire image area into plural image areas having a same area size as that of a shift-invariant area calculated from a result of the image area dividing process and including the representative position. This embodiment is different from Embodiment 1 only in the division evaluation value calculation process, which is performed in Embodiment 1 at step S304 shown in FIG. 3, and the configuration of the image pickup apparatus and other processes in this embodiment are same as those in Embodiment 1.

Figure 13:
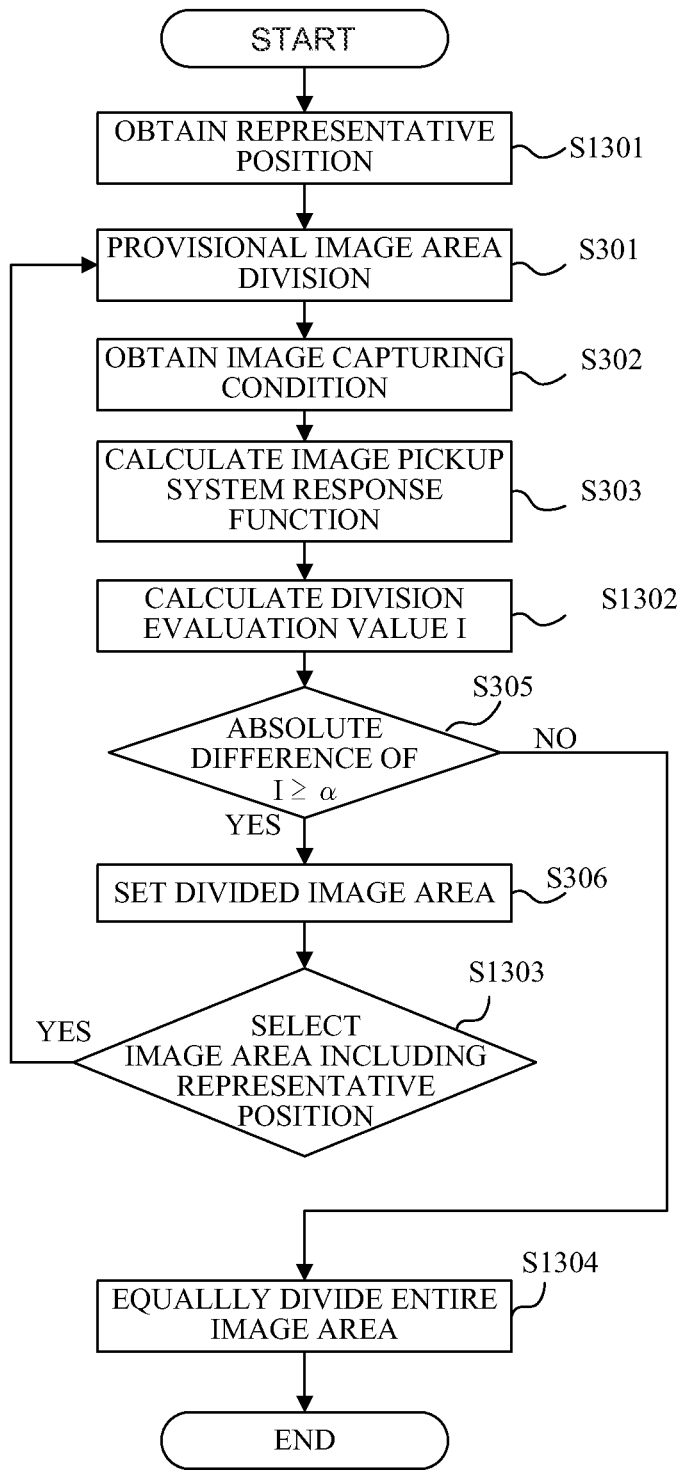
FIG. 13 is a flowchart showing operations of an image area dividing part in an image pickup apparatus that is Embodiment 5 of the present invention.

Next, description of operations of the image pickup apparatus 2 will be made. Only operations different from those of the image pickup apparatus 1 of Embodiment 1 will be herein described. Specifically, in this embodiment, at step S202 shown in FIG. 2, an image area dividing process shown by a flowchart of FIG. 13 is performed, instead of the image area dividing process shown by the flowchart of FIG. 3. Steps in FIG. 13 identical to those in FIG. 3 are denoted by the same step numbers as those in FIG. 3 and their description is omitted.

First at step S1301, the image area dividing part 1102 obtains a representative position in the image area, the representative position being specified by a user's specifying operation or by the system controller 108 operating according to a predetermined algorithm. Since accuracy and calculation speed of the high-definition imaging process vary depending on position in the image area, the representative position is specified according to purpose of the high-definition imaging process. In general, when the representative position is specified in a peripheral part of the image area where the change of the image pickup system response function is large, image area division is performed into comparatively small shift-invariant areas. In this case, image area division sufficiently corresponding to the change of the image pickup system response function is performed, but a calculation amount and a memory capacity for storing the image pickup system response functions increase.

In contrast thereto, when the representative position is specified in a central part of the image area where the change of the image pickup system response function is small, image area division is performed into comparatively large shift-invariant areas, and thereby the calculation amount and the memory capacity for storing the image pickup system response functions reduce. However, the accuracy of the high-definition imaging process tends to decrease.

Then, after performing the processes at steps S301 to S303, the image area dividing part 1102 calculates at step S1302 the division evaluation value. The calculation method of the division evaluation value may be any of the methods described in Embodiments 1 to 4.

Moreover, after performing the processes at steps S305 and S306, the image area dividing part 1102 at step S1303 selects one divided image area including the representative position from plural divided image areas obtained by the image area division. A detailed description of this process will hereinafter be made with reference to FIG. 14.

Figure 14:
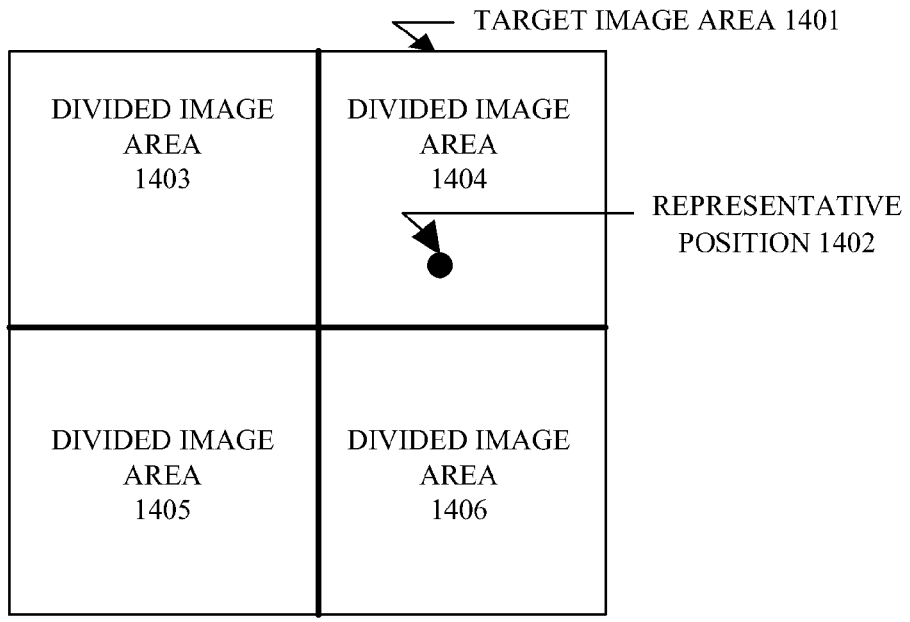
FIG. 14 shows a relationship of a division result of the target image area and a representative position.

FIG. 14 shows a state where a target image area 1401 are divided into divided image areas 1403, 1404, 1405 and 1406 after the process at step S306. A representative position 1402 is included in the divided image area 1404.

The image area dividing part 1102 repeats the processes from step S301 only on the divided image area 1404 including the representative position 1402. When a divided image area including the representative position 1402 thus becomes the shift-invariant area, the image area dividing part 1102 proceeds to step S1304.

Figure 15:
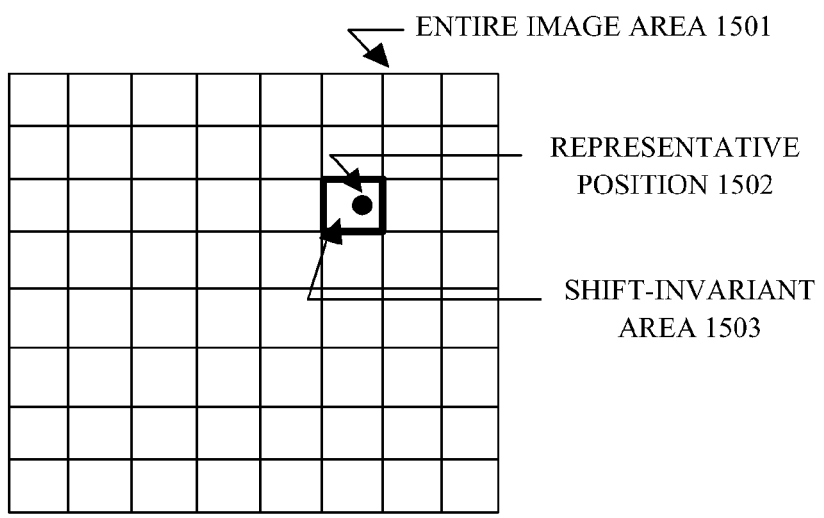
FIG. 15 shows a relationship of the division result of the target image area and a shift invariant area including the representative position.

At step S1304, the image area dividing part 1102 obtains an area size of the shift invariant calculated at step S1303 and including the representative position. Then, the image area dividing part 1102 equally divides the entire image area into plural image areas having the obtained area size. FIG. 15 shows an example of the entire image area equally divided into plural image areas.

In FIG. 15, the entire image area 1501 is equally divided into plural image areas having a same area size as that of the shift-invariant area 1503 including the representative position 1502. The entire image area may be equally divided into plural image areas having different area sizes from that of the shift-invariant area including the representative position.

Thus, this embodiment performs the image area division only in a partial image area including the representative position in the captured image, which can reduce a memory capacity for storing the image pickup system response functions as compared with a case of storing the image pickup system response functions for all respective pixels. Moreover, this embodiment can reduce a calculation amount for the image area division as compared with the image area division methods described in Embodiments 1 to 4, and therefore is suitable to an image pickup apparatus having a small memory capacity.

Embodiment 6

Next, description will be made of an image pickup apparatus that is a sixth embodiment (Embodiment 6) of the present invention. The image pickup apparatus of this embodiment stores results of an image area dividing process (hereinafter referred to as a "first image area dividing process") that has been previously performed on various captured images (first input images). The first image area dividing process is performed by using any one of the image area dividing methods described in Embodiments 1 to 3 and 5. The captured image as the first input image is hereinafter referred to as a "previously-divided image". Moreover, the image pickup apparatus of this embodiment performs, when producing a high-definition image, another image area dividing process (hereinafter referred to as a "second image area dividing process") on a captured image (second input image) that is a base image for producing the high-definition image, by using the stored results of the first image area dividing process. The captured image as the second input image is hereinafter referred to as a "process target image".

Figure 16:
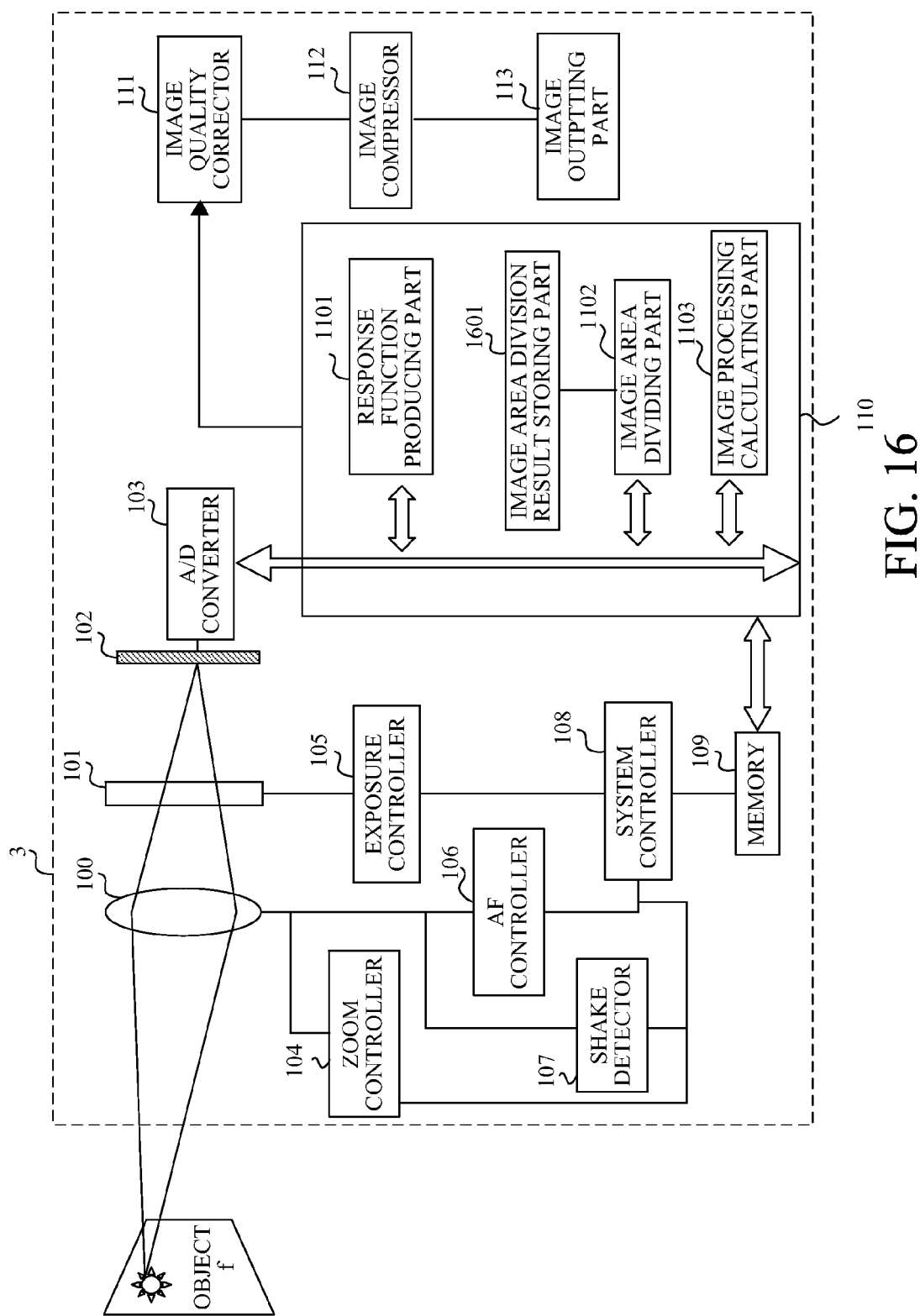
FIG. 16 is a block diagram showing the configuration of an image pickup apparatus that is Embodiment 6 of the present invention.

In the image pickup apparatus 3 shown in FIG. 16, components identical to those in the image pickup apparatus 1 shown in FIG. 1 are denoted by the same reference numerals as those in Embodiment 1 and their description is omitted. The image pickup apparatus 3 is different from the image pickup apparatus 1 in that it includes an image area division result storing part 1601. The image area division result storing part 1601 stores the image area division results of the previously-divided images.

Figure 17:
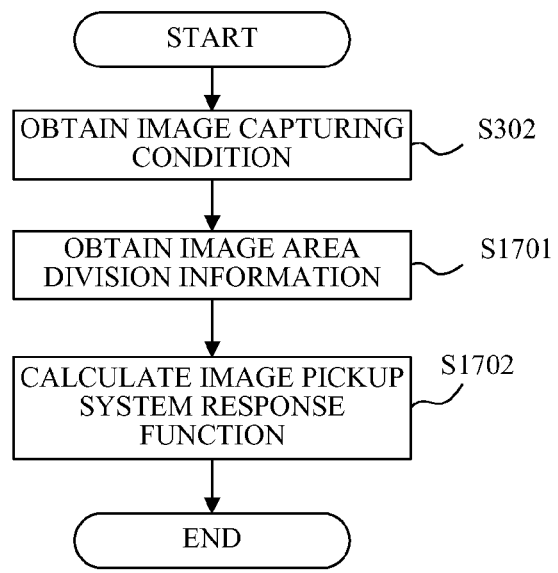
FIG. 17 is a flowchart showing operations of an image area dividing part in the image pickup apparatus of Embodiment 6.

Next, description of operations of the image pickup apparatus 3 will be made. Only operations different from those of the image pickup apparatus 1 of Embodiment 1 will be herein described. Specifically, in this embodiment, at step S202 shown in FIG. 2, an image area dividing process shown by a flowchart of FIG. 17 is performed, instead of the image area dividing process shown by the flowchart of FIG. 3. Steps in FIG. 17 identical to those in FIG. 3 are denoted by the same step numbers as those in FIG. 3 and their description is omitted.

After the process at step S302, the image area dividing part 1102 obtains, from the image area division results of the previously-divided images stored in the image area division result storing part 1601, one image area division result corresponding to the image capturing condition of the process target image obtained at step S302. The image area division result obtained by the image area dividing part 1102 may be the image area division result of the previously-divided image whose image capturing condition is closest to that of the process target image, or may be an estimated image area division result calculated from the image area division results of the plural previously-divided images whose image capturing conditions are mutually different.

Next at step S1702, the image area dividing part 1102 calculates the image pickup system response functions for the divided image areas shown in the image area division result obtained at step S1701. Each image pickup system response function is calculated by the same method as that used at step S303. Moreover, each image pickup system response function is calculated at, for example, a center of each shift-invariant area. After the process at step S1702, the image area dividing part 1102 ends the image area dividing process.

Thus, this embodiment performs the image area dividing process on the process target image by using the image area division result of the other captured image (previously-divided image). Thereby, this embodiment can reduce a memory capacity for storing the image pickup system response functions as compared with a case of storing the image pickup system response functions for all respective pixels. Moreover, this embodiment does not need calculation for the image area dividing process, and therefore enables reduction of time required for producing the high-definition image.

Embodiment 7

Although each of Embodiments 1 to 6 described the case where the image processor (image processing apparatus) 110 is built in the image pickup apparatus, embodiments of the present invention are not limited thereto.

Figure 18:
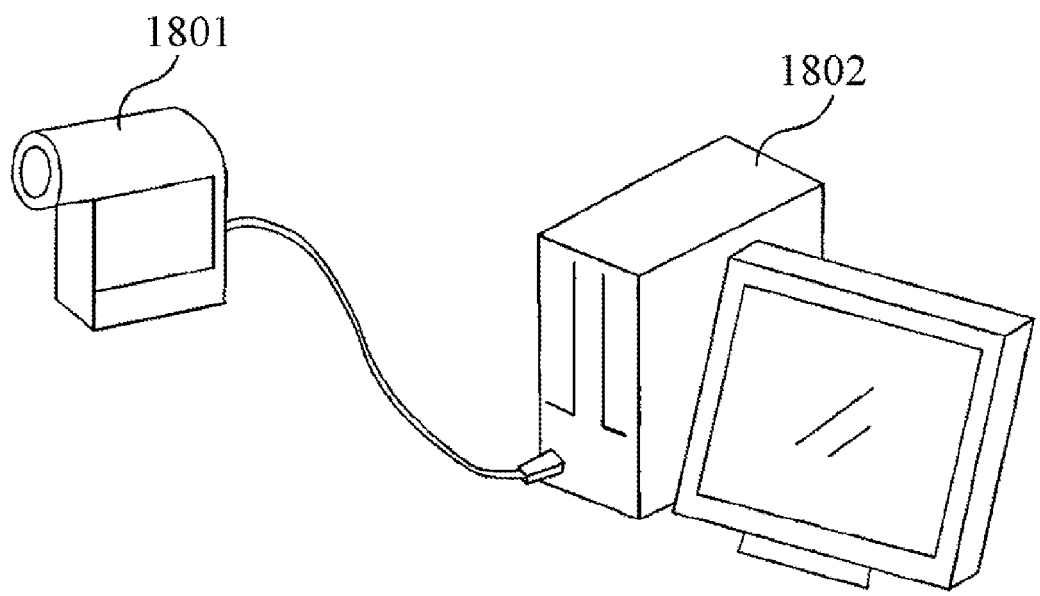
FIG. 18 shows the configuration of an image processing apparatus that is Embodiment 7 of the present invention.

For example, as shown in FIG. 18, a captured image produced in an image pickup apparatus 1801 is transmitted to a personal computer 1802 through a cable, wireless communication, Internet or LAN.

Then, the personal computer 1802 may perform the image area dividing process and the high-definition imaging process described in Embodiments 1 to 6 on the received captured image. In this case, the personal computer 1802 serves as an image processing apparatus.

In addition, the image processing program described in Embodiments 1 to 6 may be installed in image pickup apparatuses and personal computers through a storage medium such as a semiconductor memory and an optical disc, Internet and LAN.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-137034, filed on Jun. 16, 2010, which is hereby incorporated by reference herein in its entirety.

What is claimed is:

1. An image processing apparatus comprising:
an area dividing part configured to divide an input image produced by an image pickup system into plural provisional areas, to obtain in each provisional area an evaluation value by using a response function of the image pickup system, and to determine whether or not a difference between the evaluation values of two provisional areas adjacent to each other is not less than a threshold to set the provisional areas whose obtained evaluation values are mutually different as divided image areas; and
a processing part configured to perform image processing on the divided image areas by using response functions different for the respective divided image areas to produce an output image whose definition is higher than that of the input image,
wherein area dividing part is configured to repeatedly divide the input image and determine whether or not the difference between the evaluation values of two provisional areas adjacent to each other is not less than a threshold until the input image is divided into provisional areas where the difference between the evaluation values is less than the threshold.

2. The image processing apparatus according to claim 1, wherein the area dividing part is configured to perform weighting for reducing a division number of the image areas on the response functions and obtain the evaluation values from a result of the weighting.

3. The image processing apparatus according to claim 2, wherein the area dividing part is configured to automatically perform the weighting based on a spatial frequency characteristic of human vision.

4. An image pickup apparatus comprising:
an image pickup system; and
an image processing apparatus according to claim 1.

5. The image processing apparatus according to claim 1, wherein the response function of the image pickup system includes information of a modulation transfer function (MTF).

6. The image processing apparatus according to claim 1, wherein the response function of the image pickup system includes information of an aberration of the image pickup system.

7. An image processing method comprising:
dividing an input image produced by an image pickup system into plural provisional areas, to obtain in each provisional area an evaluation value by using a response function of the image pickup system, and determining whether or not a difference between the evaluation values of two provisional areas adjacent to each other is not less than a threshold to set the provisional areas whose obtained evaluation values are mutually different as divided image areas; and
performing image processing on the divided image areas by using response functions different for the respective divided image areas to produce an output image whose definition is higher than that of the input image,
wherein the dividing and the determining are repeated until the input image is divided into provisional areas where the difference between the evaluation values is less than the threshold.

8. A non-transitory computer readable storage medium storing a computer program that causes a computer to perform operations, the operations comprising:
dividing an input image produced by an image pickup system into plural provisional areas, to obtain in each provisional area an evaluation value by using a response function of the image pickup system, and determining whether or not a difference between the evaluation values of two provisional areas adjacent to each other is not less than a threshold to set the provisional areas whose obtained evaluation values are mutually different as divided image areas; and
performing image processing on the divided image areas by using response functions different for the respective divided image areas to produce an output image whose definition is higher than that of the input image,
wherein the dividing and the determining are repeated until the input image is divided into provisional areas where the difference between the evaluation values is less than the threshold.

9. An image processing apparatus comprising:
an area dividing part configured to divide an input image produced by an image pickup system into plural image areas whose evaluation values obtained by using a response function of the image pickup system are mutually different such that differences of the evaluation values of all the divided plural image areas each become less than a predetermined value; and
a processing part configured to perform image processing on the divided plural image areas by using response functions different for the respective plural image areas to produce an output image whose definition is higher than that of the input image,
wherein the area dividing part is configured to determine whether or not a difference between the evaluation values of two image areas adjacent to each other is not less than the predetermined value and to repeatedly divide the input image and determine whether or not the difference between the evaluation values of two image areas adjacent to each other is not less than the predetermined value until the input image is divided into the plural image areas where the differences between the evaluation values of all the divided plural image areas each become less than the predetermined value.

10. The image processing apparatus according to claim 9, wherein the area dividing part is configured to perform weighting for reducing a division number of the image areas on the response functions and obtain the evaluation values from a result of the weighting.

11. The image processing apparatus according to claim 9, wherein the area dividing part is configured to automatically perform the weighting based on a spatial frequency characteristic of human vision.

12. An image pickup apparatus comprising:
an image pickup system; and
an image processing apparatus according to claim 9.

13. An image processing method comprising:
dividing an input image produced by an image pickup system into plural image areas whose evaluation values obtained by using a response function of the image pickup system are mutually different such that differences of the evaluation values of all the divided plural image areas each become less than a predetermined value; and
performing image processing on the divided plural image areas by using response functions different for the respective plural image areas to produce an output image whose definition is higher than that of the input image,
wherein dividing the input image includes determining whether or not a difference between the evaluation values of two image areas adjacent to each other is not less than the predetermined value, and the dividing and the determining are repeated until the input image is divided into the plural image areas where the differences between the evaluation values of all the divided plural image areas each become less than the predetermined value.

14. A non-transitory computer readable storage medium storing a computer program that causes a computer to perform operations, the operations comprising:
dividing an input image produced by an image pickup system into plural image areas whose evaluation values obtained by using a response function of the image pickup system are mutually different such that differences of the evaluation values of all the divided plural image areas each become less than a predetermined value; and
performing image processing on the divided plural image areas by using response functions different for the respective plural image areas to produce an output image whose definition is higher than that of the input image,
wherein dividing the input image includes determining whether or not a difference between the evaluation values of two image areas adjacent to each other is not less than the predetermined value, and the dividing and the determining are repeated until the input image is divided into the plural image areas where the differences between the evaluation values of all the divided plural image areas each become less than the predetermined value.

* * * * *